(12) United States Patent
Kobayashi

(10) Patent No.: US 6,617,832 B1
(45) Date of Patent: Sep. 9, 2003

(54) LOW RIPPLE SCALABLE DC-TO-DC CONVERTER CIRCUIT

(75) Inventor: Marc J. Kobayashi, Oro Valley, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/161,536

(22) Filed: Jun. 3, 2002

(51) Int. Cl.[7] .............................................. G05F 1/40
(52) U.S. Cl. ...................................... 323/266; 323/280
(58) Field of Search ................................ 323/280, 281, 323/288, 266; 327/536, 538; 363/59, 60

(56) References Cited

U.S. PATENT DOCUMENTS

| | | | | |
|---|---|---|---|---|
| 6,356,062 B1 | * | 3/2002 | Elmhurst et al. | ........... 323/282 |
| 6,359,797 B1 | * | 3/2002 | Bayer et al. | ................... 363/60 |
| 6,404,290 B1 | * | 6/2002 | Voo | .............................. 331/8 |
| 6,438,005 B1 | * | 8/2002 | Walter | ......................... 363/60 |
| 6,531,792 B2 | * | 3/2003 | Oshio | ......................... 307/109 |

OTHER PUBLICATIONS

LTC1682/LTC1682–3.3/LTC1682–5 Double Charge Pumps With Low Noise Linear Regulator, Linear Technology Corporation, 1999, pp. 1–12.
REG101 DMOS 100mA Low–Dropout Regulator, Burr–Brown Products from Texas Instruments, Texas Instruments Incorporated, Jul. 2001, pp. 1–14.

* cited by examiner

Primary Examiner—Shawn Riley
(74) Attorney, Agent, or Firm—W. Daniel Swayze, Jr.; W. James Brady; Frederick J. Telecky, Jr.

(57) ABSTRACT

A circuit for boosting an input voltage ($V_{IN}$) to provide a low ripple output voltage ($V_{OUT}$) regulates flow of current between a source of the input voltage ($V_{IN}$) and a circuit node (17) in response to a feedback signal (16) representative of the output voltage ($V_{OUT}$). A charge pump circuit operates to repetitively charge a pump capacitor ($C_{PMP}$) to a voltage equal to the input voltage ($V_{IN}$) and redistribute charge between the pump capacitor ($C_{PMP}$) and a level-shifting capacitor ($C_{LS}$) coupled between the circuit node (17) and an output conductor (15) conducting the output voltage ($V_{OUT}$) so as to maintain the boosted output voltage ($V_{OUT}$).

23 Claims, 8 Drawing Sheets

US 6,617,832 B1

LOW RIPPLE SCALABLE DC-TO-DC CONVERTER CIRCUIT

BACKGROUND OF THE INVENTION

The invention relates to a method and circuit for providing a low ripple regulated output voltage of greater magnitude than an unregulated input voltage applied to the circuit.

FIG. 1A shows a conventional charge pump 1 in which an input voltage $V_{IN}$ is applied between an input terminal 2 and the ground conductor 3. During a first phase, a pair of switches 4 and 8 are closed to connect the upper terminal 5 and the lower terminal 9 of a pump capacitor $C_{PMP}$ to $V_{IN}$ and to ground, respectively. A pair of switches 6 and 10 each have a terminal connected to terminal 5 and to terminal 9, respectively. Both of switches 6 and 10 are open during the first phase. The pump capacitor $C_{PMP}$ therefore is charged to $V_{IN}$ during the first phase. During a second phase, switches 4 and 8 are open, and switches 6 and 10 are closed, as shown in FIG. 1B. Switch 6 connects the upper terminal 5 of $C_{PMP}$ to output conductor 7, which is connected to the upper terminal of output capacitor $C_{OUT}$. Switch 10 connects the lower terminal 9 of $C_{PMP}$ to $V_{IN}$. As the first and second phases are repeated, the output voltage $V_{OUT}$ on conductor 7 increases to $2 V_{IN}$. However, conventional charge pump 1 produces a large ripple voltage, typically of approximately 50 millivolts amplitude, in $V_{OUT}$. This is because pump capacitor $C_{PMP}$ is repetitively connected and disconnected between $V_{IN}$ and $V_{OUT}$, causing a ripple voltage proportional to the ratio between $C_{PMP}$ and $C_{OUT}$.

In some applications, a much lower level of ripple voltage amplitude may be required, for example, in a DC-to-DC converter used as a power supply for a precision voltage reference, a low-noise, low-offset operational amplifier, or any application sensitive to noise or perturbations on the power supply voltage. Reducing the ripple voltage by filtering may be unduly impractical and expensive because of the size and cost of the components needed to implement the filter. Some applications of low noise DC-to-DC converter circuits include their use in cell phones, PDAs (personal digital assistants), VCO (voltage controlled oscillator) and PLL (phase locked loop) power supplies, and smart card readers.

FIG. 2 shows a conventional linear voltage regulator 12 in which an operational amplifier 13 has its (−) input connected to a reference voltage $V_{REF}$ and output connected to the gate of a P-channel pass transistor 14. The source of pass transistor 14 is connected by conductor 17 to an unregulated input voltage $V_{IN}$. The drain of pass transistor 14 is connected by conductor 15 to produce a regulated output voltage $V_{OUT}$ on one terminal of an output capacitor $C_{OUT}$ having to the terminal connected to ground. A feedback circuit includes a resistor $R_F$ and a resistor $R_S$ connected in series between $V_{OUT}$ and ground. The junction between resistor $R_F$ and resistor RS is connected by conductor 16 to the (+) of operational amplifier 13. Regulator 12 always produces a value of $V_{OUT}$ having a lower magnitude than $V_{IN}$.

Linear Technology Corporation markets a linear regulator circuit, the LTC 1682, that utilizes a charge pump connected to supply the input voltage of a linear regulator circuit similar to the regulator shown in FIG. 2. Although this linear regulator circuit is referred to in its product specification sheet as a "low noise linear regulator", it nevertheless has the shortcoming that it produces a large ripple voltage (i.e., a large noise voltage) superimposed on the regulated output voltage produced.

Thus, there is an unmet need for an improved charge pump circuit that is capable of boosting an input voltage so as to provide a boosted output voltage having a much lower ripple voltage than conventional charge pump circuits.

There also is an unmet need for an improved DC-to-DC converter circuit that is capable of boosting an input voltage to provide a boosted output voltage having a much lower ripple voltage than conventional DC-to-DC converter circuits.

SUMMARY OF THE INVENTION

Accordingly, it is an object of the invention to provide an improved charge pump circuit that is capable of boosting an input voltage so as to provide a boosted output voltage having a much lower ripple voltage than conventional charge pump circuits.

It is another object of the invention to provide an improved charge pump circuit that is capable of boosting an input voltage so as to provide a boosted output voltage having a low ripple voltage, which charge pump circuit is conveniently scalable to boost the input voltage to produce a higher amplitude, low ripple output voltage by using multiple pump capacitors.

It is another object of the invention to provide a DC-to-DC converter that is capable of boosting an input voltage so as to provide a boosted output voltage having a low ripple voltage, including a charge pump circuit that is conveniently scalable to boost the input voltage of the DC-to-DC converter to produce a higher amplitude, low ripple output voltage.

It is another object of the invention to provide an improved DC-to-DC converter circuit that is capable of boosting an input voltage so as to provide a boosted output voltage having a low ripple voltage, which DC-to-DC converter circuit is conveniently scalable to boost the input voltage to produce a higher amplitude, low-ripple output voltage by using an inductor and capacitor.

Briefly described, and in accordance with one embodiment thereof, the invention provides a DC-to-DC conversion circuit having an input conductor for receiving an input voltage ($V_{IN}$) and an output conductor (15) for conducting an output voltage ($V_{OUT}$), the DC-to-DC conversion circuit, including a pass transistor (14) having a first electrode coupled to receive the input voltage ($V_{IN}$) and a second electrode coupled to a first conductor (17). An amplifier circuit (13) has a first input coupled to receive a first reference voltage ($V_{REF}$) and an output coupled to a control electrode of the pass transistor. Level shifting circuitry (18) is coupled to the first conductor (17), the output conductor (15), the input conductor, and a conductor conducting a second reference voltage (GND), wherein the level shifting circuitry is capable of providing energy needed to boost the output voltage to a required level. A feedback circuit is coupled between the output conductor (15) and a second input of the amplifying circuit (13).

In one embodiment, the invention provides a circuit for boosting an input voltage ($V_{IN}$) to provide a low ripple output voltage ($V_{OUT}$) by regulating flow of current between a source of the input voltage ($V_{IN}$) and a circuit node (17) in response to a feedback signal (16) representative of the output voltage ($V_{OUT}$). A charge pump circuit operates to repetitively charge a pump element ($C_{PMP}$ or $L_{PMP}$) to a voltage determined by the input voltage ($V_{IN}$) and redistribute charge between the pump element and a level-shifting capacitor ($C_{LS}$) coupled between the circuit node (17) and an output conductor (15) conducting the output voltage ($V_{OUT}$) so as to maintain the boosted output voltage ($V_{OUT}$).

In one embodiment a DC-to-DC conversion circuit having an input conductor receiving an input voltage ($V_{IN}$) and an output conductor (15) for conducting an output voltage ($V_{OUT}$), the DC-to-DC conversion circuit includes a pass transistor (14) having a first electrode coupled to receive the input voltage ($V_{IN}$) and the second electrode coupled to the circuit node (17). An amplifier circuit (13) driving the pass transistor has a first input coupled to receive a first reference voltage ($V_{REF}$) and second input receiving the feedback signal (16). A level-shifting isolation capacitor ($C_{LS}$) is coupled between the circuit node (17) and the output conductor (15). A charge pump circuit includes a first input terminal coupled to receive a second reference voltage (GND), a second input terminal coupled to receive the input voltage ($V_{IN}$), a first output terminal coupled to the circuit node (17), and a second output terminal coupled to the output conductor (15). The charge pump circuit includes a pump capacitor ($C_{PMP}$), a first switch (20) coupled between the circuit node (17) and a first terminal (21) of the pump capacitor, a second switch (22) coupled between the first terminal of the pump capacitor and the second reference voltage (GND), a third switch (23) coupled between the output conductor (15) and a second terminal (24) of the pump capacitor, and a fourth switch (25) coupled between the second terminal of the pump capacitor and the input voltage ($V_{IN}$). The feedback circuitry includes a first resistor coupled between the output conductor and the second input of the amplifier circuitry and a second resistor coupled between the second input of the amplifier circuitry and the second reference voltage (GND). The first switch (20) is a P-channel transistor having a source coupled to the circuit node (17) and a drain coupled to the first terminal of the pump capacitor, the second switch (22) is an N-channel transistor having a source coupled to the second reference voltage and a drain coupled to the first terminal of the pump capacitor, the third switch (23) is a P-channel transistor having a source coupled to the output conductor (15) and a drain coupled to the second terminal of the pump capacitor, and the fourth switch (25 is a P-channel transistor having a source coupled to the input voltage ($V_{IN}$) and a drain coupled to the second terminal of the pump capacitor. The capacitance of the level-shifting isolation capacitor ($C_{LS}$) is substantially greater than the capacitance of the pump capacitor, and wherein an output capacitance ($C_{OUT}$) is substantially greater than the capacitance of the level-shifting isolation capacitor.

In another embodiment, the charge pump circuitry includes a first pump capacitor ($C_{PMP1}$), a first switch (20) coupled between the first conductor (17) and a first terminal (21) of the first pump capacitor, a second switch (22) coupled between the first terminal of the first pump capacitor and the second reference voltage (GND), a third switch (27) coupled between a second terminal (24) of the first pump capacitor and a first terminal (31) of a second pump capacitor ($C_{PMP2}$), a fourth switch coupled between the second terminal (24) of the first pump capacitor and the input voltage ($V_{IN}$), a fifth switch (28) coupled between the first terminal (31) of the second pump capacitor ($C_{PMP2}$) and the second reference voltage (GND), between the output conductor (15) and a second terminal (24) of the pump capacitor, a sixth switch (30) coupled between a second terminal of the second pump capacitor ($C_{PMP2}$) and the input voltage ($V_{IN}$), and coupling circuitry coupled between the output conductor (15) and the second terminal of the second pump capacitor ($C_{PMP2}$). The described coupling circuitry includes a seventh switch (23) coupled between the output conductor (15) and the second terminal of the second pump capacitor ($C_{PMP2}$).

In another embodiment, an input voltage ($V_{IN}$) is boosted to provide a low ripple output voltage ($V_{OUT}$) by regulating flow of current between a source of the input voltage ($V_{IN}$) and a circuit node (17) in response to a feedback signal (16) representative of the output voltage ($V_{OUT}$), and operating DC-to-DC converter circuitry to repetitively charge a pump inductor ($L_{PMP}$) to a current supplied by a source of the input voltage ($V_{IN}$) and redistribute energy stored in the pump inductor between the pump inductor ($L_{PMP}$) and a level-shifting capacitor ($C_{LS}$) coupled between the circuit node (17) and an output conductor (15) conducting the output voltage ($V_{OUT}$) so as to maintain the output voltage ($V_{OUT}$) at a regulated level of substantially greater magnitude than the input voltage ($V_{IN}$).

In another embodiment, the invention provides a DC-to-DC conversion circuit having an input conductor for receiving a positive polarity input voltage ($V_{IN}$) and an output conductor (15) for conducting a negative polarity output voltage ($V_{OUT}$), the DC-to-DC conversion circuit including a pass transistor (14B) having a first electrode coupled to receive a first reference voltage (GND) and a second electrode coupled to a first conductor (17). An amplifier circuit (13) has a first input coupled to receive a first reference voltage ($V_{REF}$) and an output coupled to a control electrode of the pass transistor. Level shifting circuitry (18D) is coupled to the first conductor (17), the output conductor (15), the input conductor, and a conductor conducting the second reference voltage (GND), wherein the level shifting circuitry is capable of providing energy needed to boost the output voltage in the negative direction to a required level. A feedback circuit coupled between the output conductor (15) and a second input of the amplifying circuit (13).

DETAILED DESCRIPTION OF THE PREFERRED EMBODIMENTS

Figure 1A:
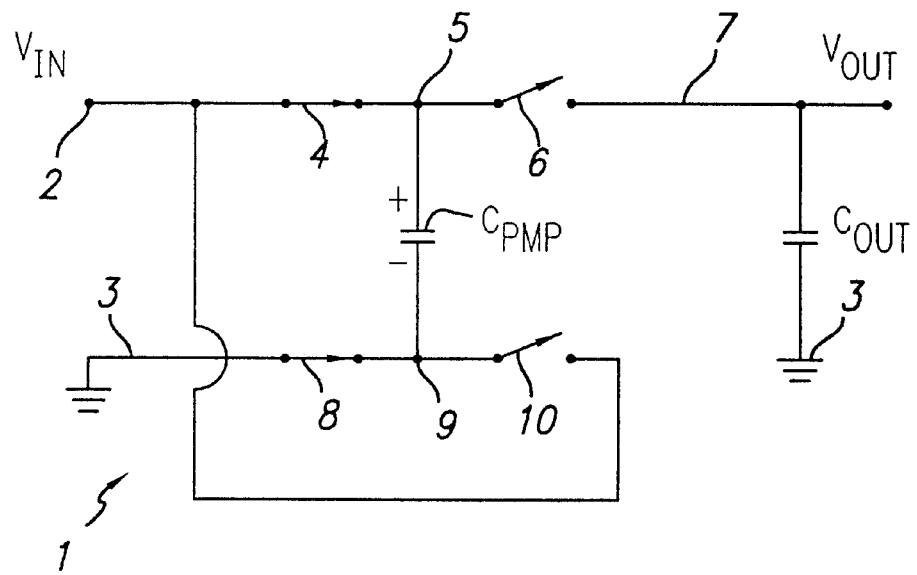
FIG. 1A is a schematic diagram of a conventional charge pump showing its operation during a first phase.
Figure 1B:
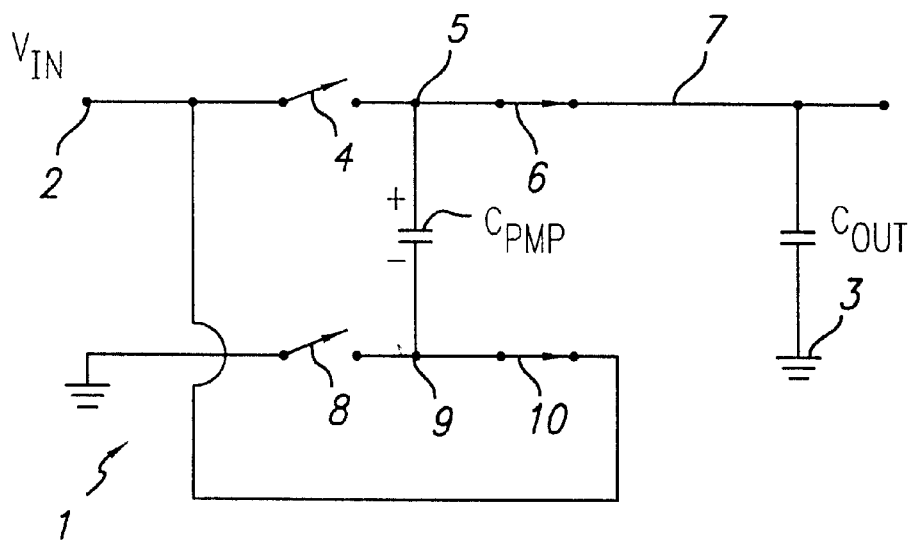
FIG. 1B is a schematic diagram illustrating the charge pump of FIG. 1A during a second phase.
Figure 2:
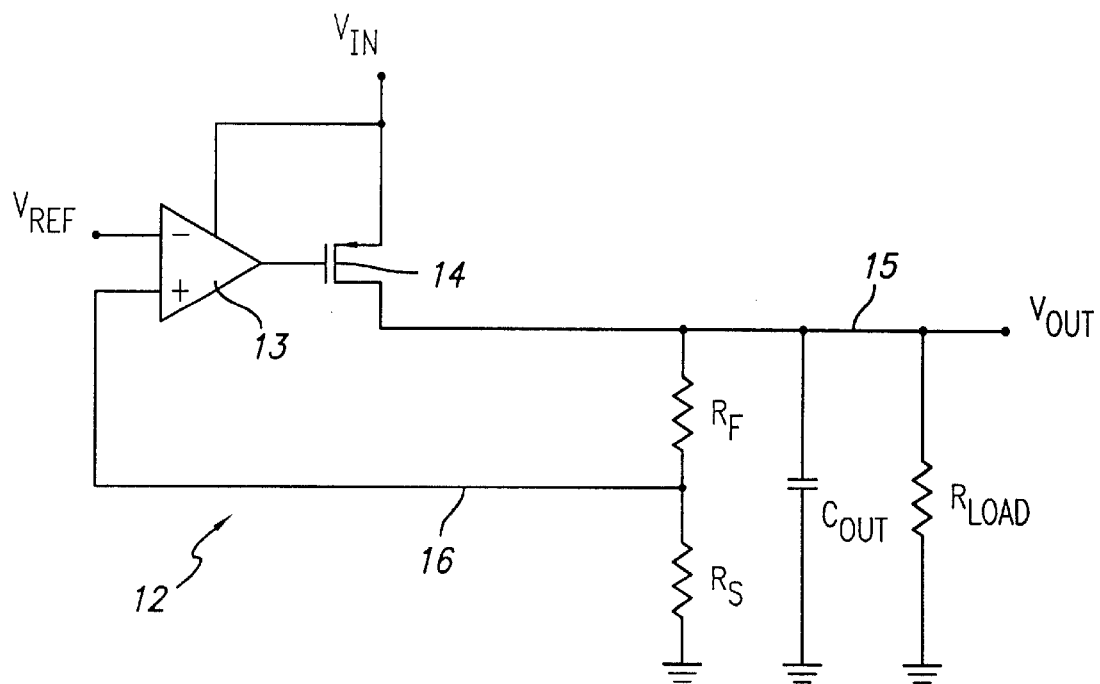
FIG. 2 is a basic schematic diagram of a conventional linear stepdown voltage regulator circuit.
Figure 3:
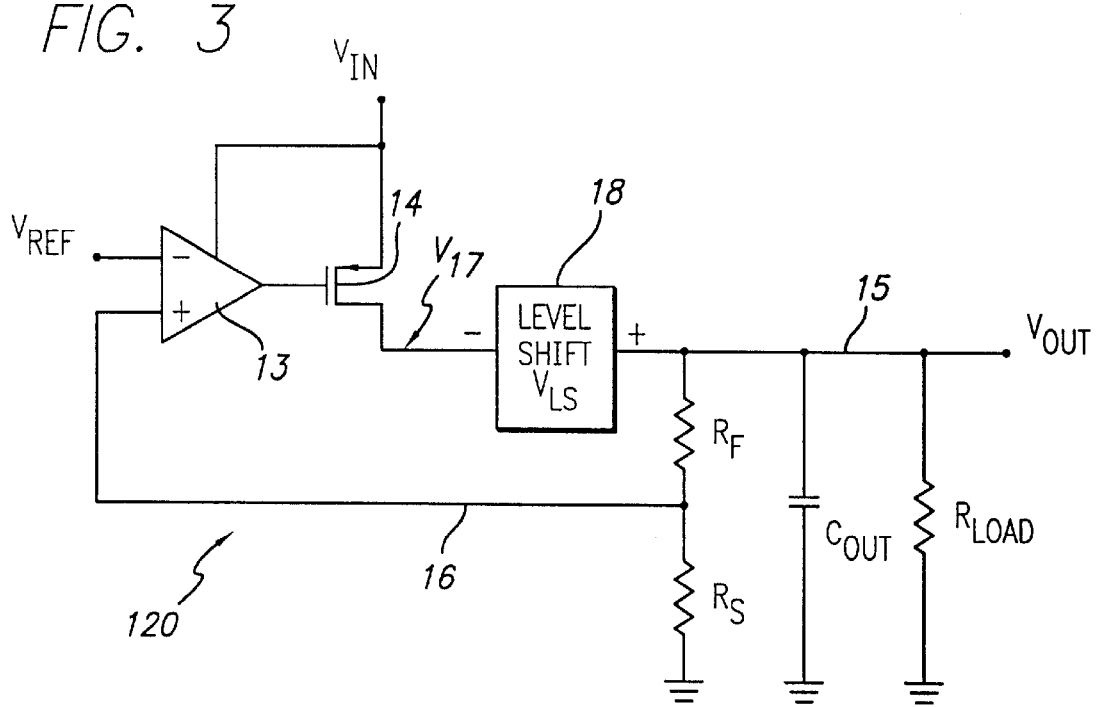
FIG. 3 is a schematic diagram of a step up linear voltage regulator circuit of the present invention.

Referring to FIG. 3, voltage regulator 120 is similar to the linear voltage regulator 12 of FIG. 2, except that the drain of pass transistor 14 is connected by conductor 17 to a (−) terminal of a voltage source 18 constituting a voltage level shift circuit 18 having its (+) terminal connected to output conductor 15 and producing a voltage level shift $V_{LS}$ that is added to the voltage $V_{17}$ on a high impedance internal circuit node 17. This boosts the value of $V_{OUT}$ that would be produced by the conventional voltage regulator 12 of FIG. 2 by $V_{LS}$ volts. Pass transistor 14, in conjunction with the feedback from $V_{OUT}$ provided by means of amplifier 13 and the resistor voltage divider including resistors $R_F$ and $R_S$, regulates the flow of current between a source of $V_{IN}$ and circuit node 17. It should be noted that the level shift circuit 18 must be capable of storing the energy needed to boost the output voltage by $V_{LS}$. In the subsequently described embodiments, the level shift circuit 18 is a charge pump, but theoretically it could be a battery or other energy-storing voltage source.

Figure 4A:
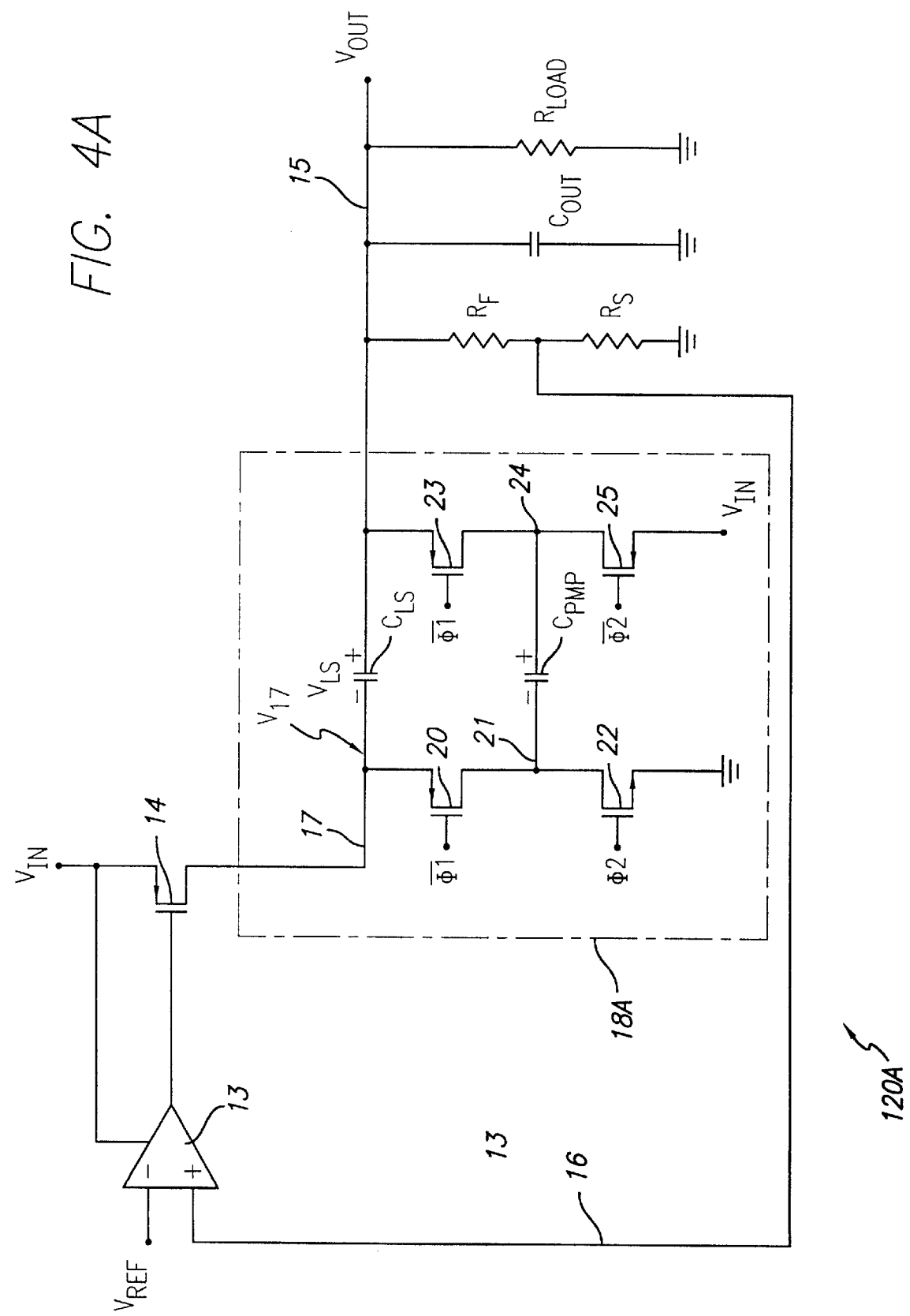
FIG. 4A is a schematic diagram of a first embodiment of a low ripple charge pump DC-to-DC converter of the present invention which, depending on the amount of feedback, can increase the output voltage to as much as double the input supply voltage.

Referring to FIG. 4A, an integrated circuit DC-to-DC converter 120A is provided by replacing the voltage level shift circuit 18 in FIG. 3 by a charge pump circuit 18A which includes level-shifting isolation capacitor $C_{LS}$. Charge pump circuit 18A includes a P-channel transistor 20 having its source connected to node 17 and its drain connected by conductor 21 to the (−) terminal of a charge pump capacitor $C_{PMP}$. Node 17 also is connected to the (−) terminal of a level shift capacitor $C_{LS}$, the (+) terminal of which is connected to output conductor 15. Conductor 21 also is connected to the drain of an N-channel transistor 22 having its source connected to ground. The source of a P-channel transistor 23 is connected to output conductor 15, and the drain of transistor 23 is connected by conductor 24 to the (+) terminal of $C_{PMP}$ and to the drain of a P-channel transistor 25 having its source connected to $V_{IN}$. The gate of transistor 22 is connected to receive a clock signal $\Phi 2$. The gate of transistor 25 is connected to receive the complement of $\Phi 2$. The gates of transistors 20 and 23 are connected to receive the complement of a clock signal $\Phi 1$ which is out of phase with $\Phi 2$. Representative values of $C_{PMP}$, $C_{LS}$ and $C_{OUT}$ are 2.2, 2.2, and 2.2 picofarads, respectively. Ordinarily, these large capacitors would be discrete external components. (Those skilled in the art will recognize that a field effect transistor is bilateral in the sense that its source and drain are functionally interchangeable. Therefore, the arrows in the drawings indicating the source electrodes of the MOSFETs (metal oxide semiconductor field effect transistors) are intended to identify the electrodes, not to limit their functions to being source electrodes. Similarly, in the claims the terms "source" and "drain" may be used to identify a particular physical terminal of a field effect transistor but do not necessarily limit the terminal to functioning only as a source or only as a drain.)

In operation, transistors 22 and 25 are both turned on and transistors 20 and 23 are turned off during 42. This causes $C_{PMP}$ to be charged to $V_{IN}$. Then during $\Phi$ transistors 20 and 23 are turned on and transistors 22 and 25 are turned off. This causes a transfer of charge between $C_{PMP}$ and $C_{LS}$ so as to tend to equalize the voltage across them. The repetitive cycles of $\Phi 1$ and $\Phi 2$ cause the voltage across $C_{LS}$ to gradually increase to and be maintained at approximately $+V_{IN}$ volts as charge pumped into $C_{LS}$ is continually redistributed through output conductor 15 to $C_{OUT}$ So as to maintain $V_{OUT}$ a level such that the voltage of the (+) input of operational amplifier 13 is kept equal to $V_{REF}$ Thus, the charge pump circuitry shown in FIG. 4A performs the function of repetitively charging pump capacitor $C_{PMP}$ to a voltage equal to the input voltage $V_{IN}$ and redistributing charge between pump capacitor $C_{PMP}$ and the level-shifting capacitor $C_{LS}$ coupled between circuit node 17 and output conductor 15 so as to maintain $V_{OUT}$ at a regulated level of substantially greater magnitude than $V_{IN}$. Since $C_{OUT}$ is much larger than $C_{LS}$, the ripple in $V_{OUT}$ is very small, typically less than 5 millivolts. In the embodiment of FIG. 4A, the high impedance of the drain electrode of pass transistor 14 allows it to function as a controlled current source so that the voltage $V_{17}$ on the internal node 17 can swing up and down as needed to enable the operation of transistors of 20, 22, 23 and 25 and charge pump capacitor $C_{PMP}$ to keep $C_{LS}$ charged up to an average value of $V_{IN}$ volts without causing a large ripple component in $V_{OUT}$.

Figure 4B:
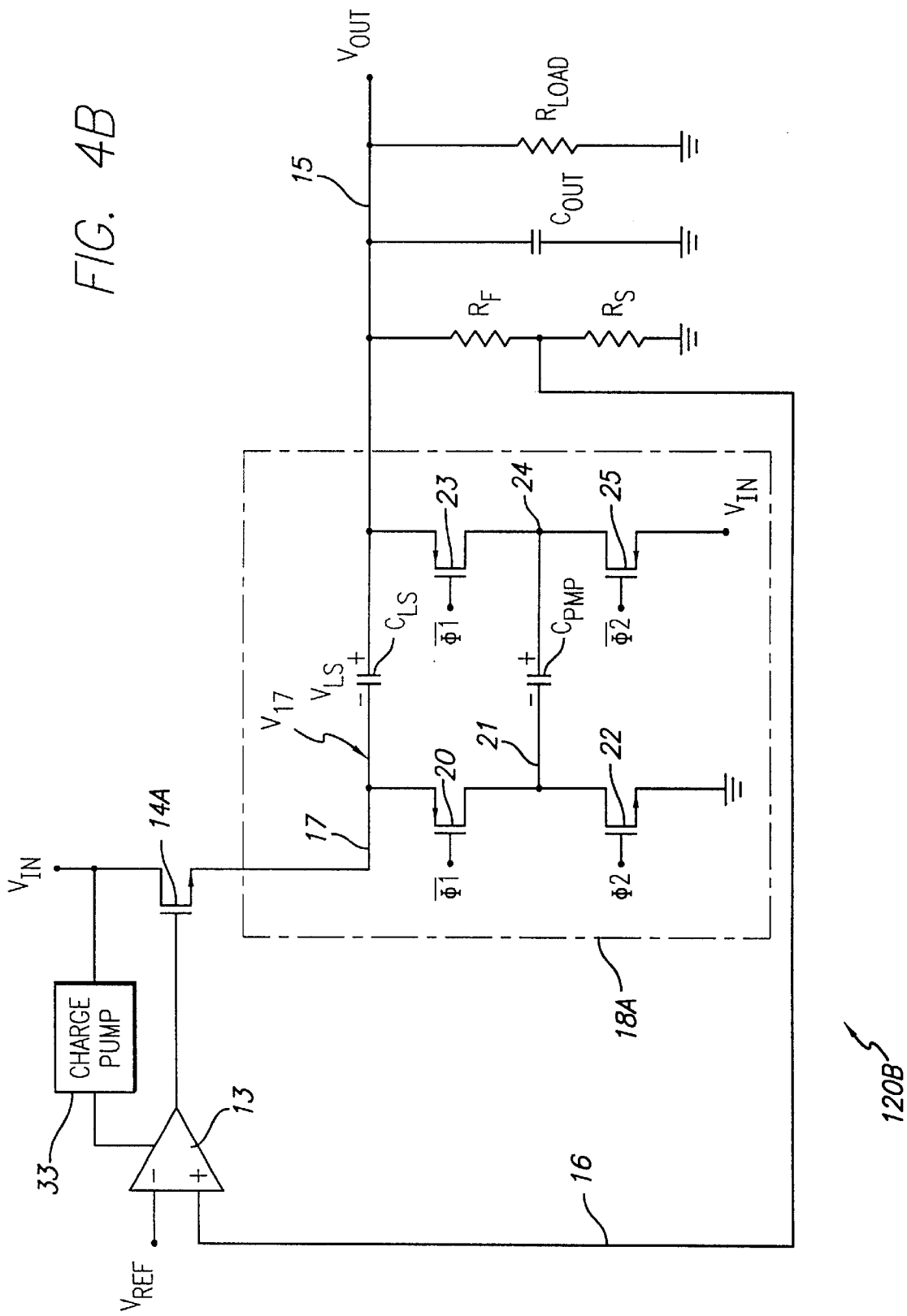
FIG. 4B is a schematic diagram of a second embodiment of a low ripple charge pump DC-to-DC converter of the present invention which, depending on the amount of feedback, can increase the output voltage to as much as double the input supply voltage.

FIG. 4B shows another DC-to-DC converter 120B which is essentially identical to the one shown in FIG. 4A except that P-channel pass transistor 14 in FIG. 4A has been replaced by the combination of N-channel pass transistor 14A, and a low noise charge pump 33 connected between $V_{IN}$ and the voltage supply terminal of amplifier 13. Low noise charge pump 33 can be a conventional circuit, such as the low noise charge pump shown in FIG. 4 of the product specification publication for the Texas Instruments REG 101 low-dropout regulator. The operation of DC-to-DC converter 120B is essentially the same as the operation of DC-to-DC converter 120A. The low noise charge pump 33 operates to control the gain of the N-channel pass transistor 14A, which is connected in a source follower configuration. Charge pump 33 produces a higher supply voltage than the input voltage $V_{IN}$ and allows the output of amplifier 13 to swing higher than $V_{IN}$. This allows amplifier 13 to control transistor 14A given when the voltage on conductor 17 approaches $V_{IN}$. Although node 17 in FIG. 4B has lower impedance than in FIG. 4A, the feedback path in FIG. 4B provides enough gain to cause the voltage $V_{17}$ of node 17 in FIG. 4B to have a waveform similar to the corresponding waveform in FIG. 4A, so as to "absorb" the ripple caused by the charge pump operation of charge pump circuit 18A and thereby provide a very low ripple voltage component in $V_{OUT}$ on output conductor 15.

Figure 6:
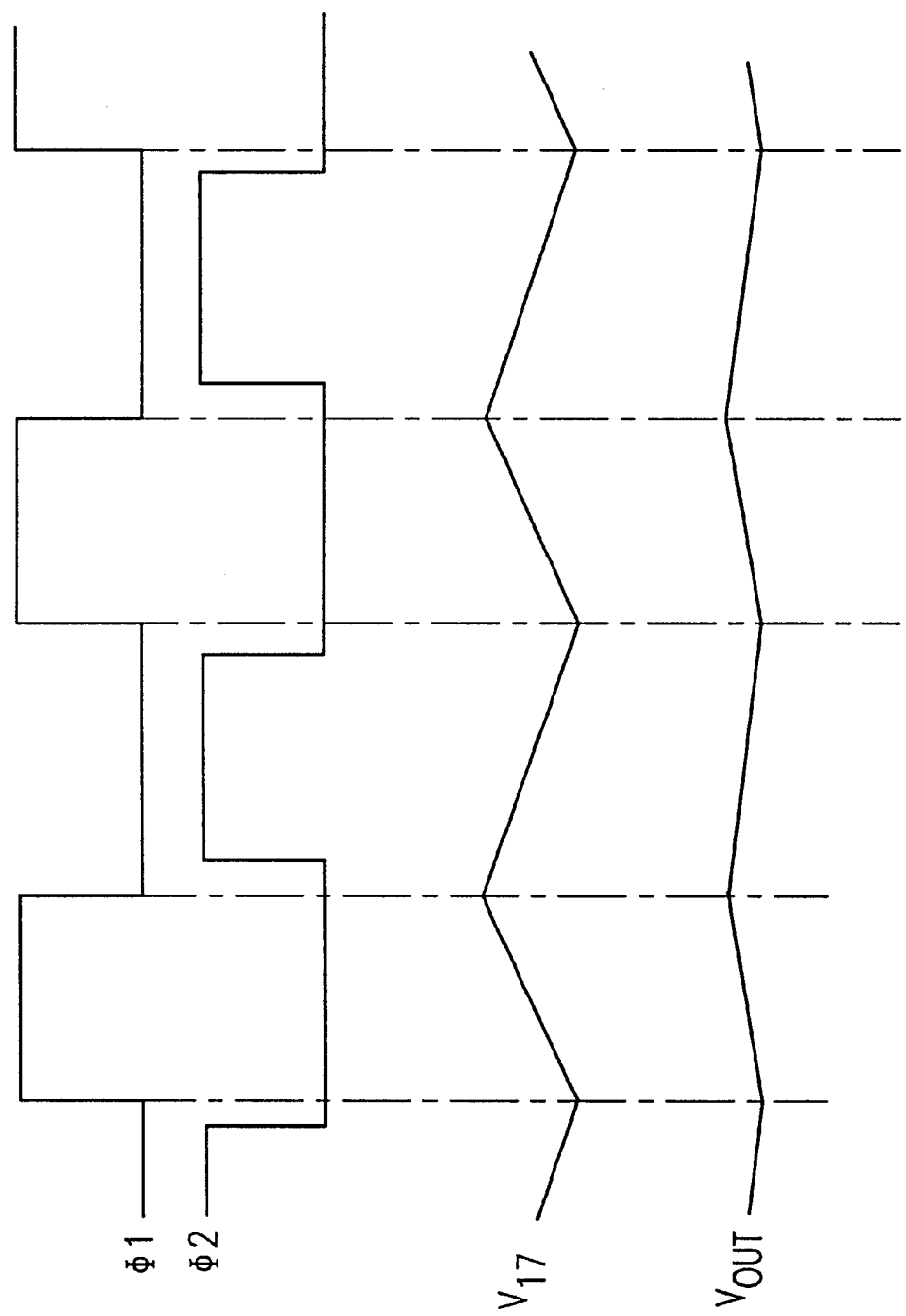
FIG. 6 is a timing diagram showing the clock signals, the voltage of an internal circuit node, and the output voltage of the DC-to-DC converter of FIGS. 4A, 4B and 5.

The timing diagram of FIG. 6 shows the waveforms of the out-of-phase clock signals $\Phi 1$ and $\Phi 2$ and also shows the waveforms under steady-state conditions of the voltage $V_{17}$ on node 17 due to the above described charge pumping of transistors 20, 22, 23 and 25 in FIGS. 4A and 4B in response to $\Phi 1$ and $\Phi 2$. The charge pumping causes $V_{17}$ to have an amplitude of approximately 50 millivolts, which is large enough to "absorb" nearly all of the voltage generated across capacitor $C_{LS}$ by the charge pumping, leaving a much lower amplitude "ripple" voltage component of only approximately 5 millivolts in $V_{OUT}$, as shown in the bottom waveform of FIG. 6.

Figure 5:
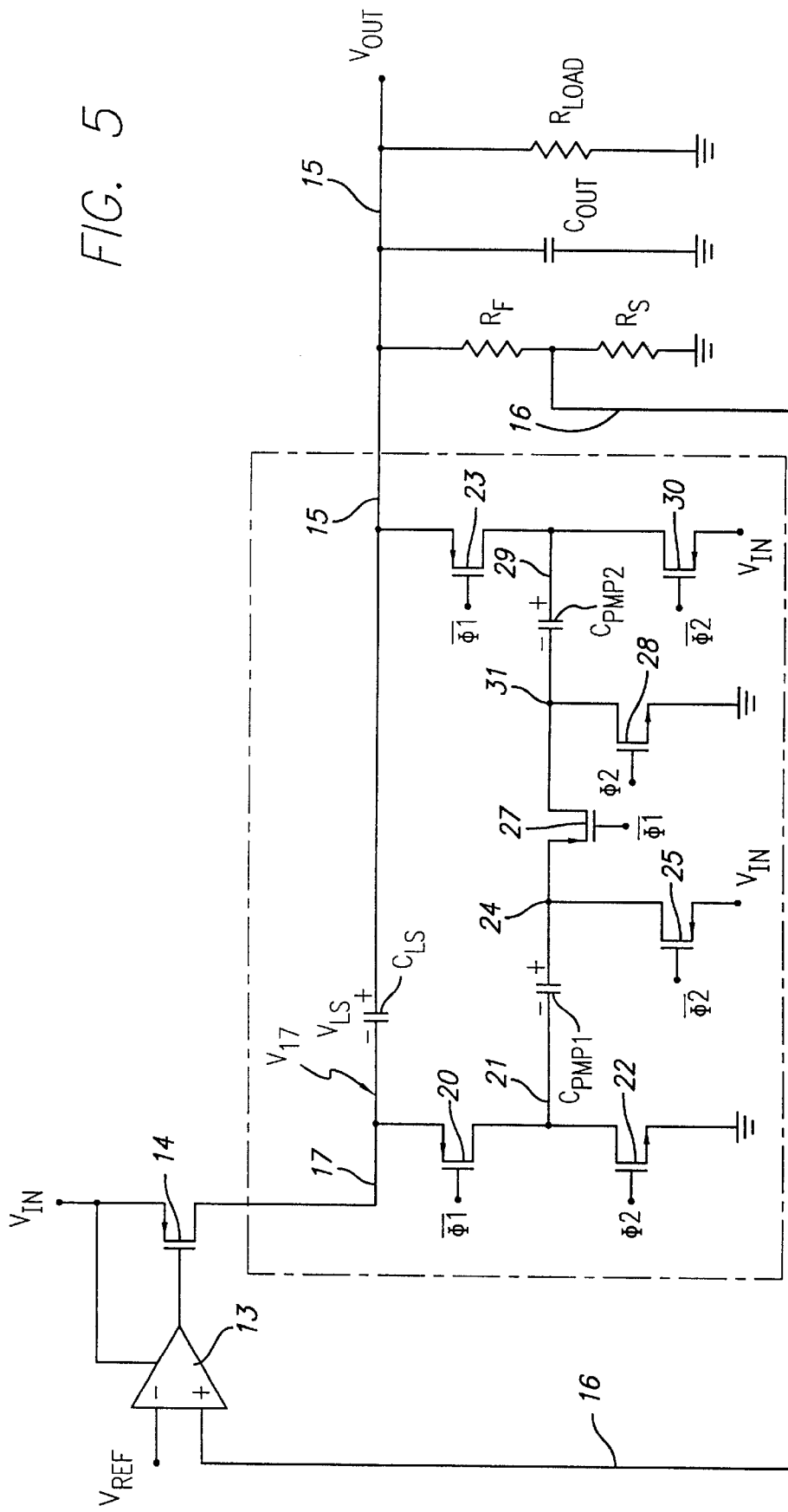
FIG. 5 is a schematic diagram of a low ripple charge pump DC-to-DC converter of the present invention which, depending on the amount of feedback, can increase the output voltage to as much as triple the input supply voltage.

FIG. 5 shows a DC-to-DC converter 120C which is a variation of the circuit of FIG. 4A, wherein the charge pump circuitry 18C keeps $C_{LS}$ charged up to a voltage which is 2 times $V_{IN}$ (rather than 1 times $V_{IN}$). Referring to FIG. 5, the feedback circuit, including resistors $R_F$ and $R_S$, operational amplifier 13, pass transistor 14, $C_{LS}$, and transistors 20 and 22, is the same as in FIG. 4. However, the (+) terminal of a first charge pump capacitor $C_{PMP1}$ is connected by conductor 24 to the drain of a P-channel transistor 25 having its source connected to $V_{IN}$ and to the source of a P-channel transistor 27. The drain of transistor 27 is connected by conductor 31 to a drain of an N-channel transistor 28 having its source connected to ground. Conductor 31 also is connected to the (−) terminal of a second charge pump capacitor $C_{PMP2}$ having its (+) terminal connected by conductor 29 to the drain of a P-channel transistor 23 and to the drain of a P-channel transistor 30. The source of transistor 23 is connected to output conductor 15, and the source of transistor 30 is connected to $V_{IN}$. The operation of the charge pump circuitry is similar to that in FIG. 4. During Φ2, transistors 22 and 25 are closed to charge $C_{PMP}$ up to +$V_{IN}$ volts, and similarly, transistors 28 and 30 are closed in order to charge $C_{PMP2}$ up to +$V_{IN}$ volts. During Φ1, transistors 20, 27, and 23 are closed to connect $C_{PMP1}$ and $C_{PMP2}$ in series across level shift capacitor $C_{LS}$ to thereby charge its stored voltage to 2 times $V_{IN}$. This allows a larger value of the regulated output voltage $V_{OUT}$ to be produced, with a very low magnitude ripple voltage thereon.

The above described waveforms in FIG. 6 also are applicable to the DC-to-DC converter 120C of FIG. 5.

Figure 7:
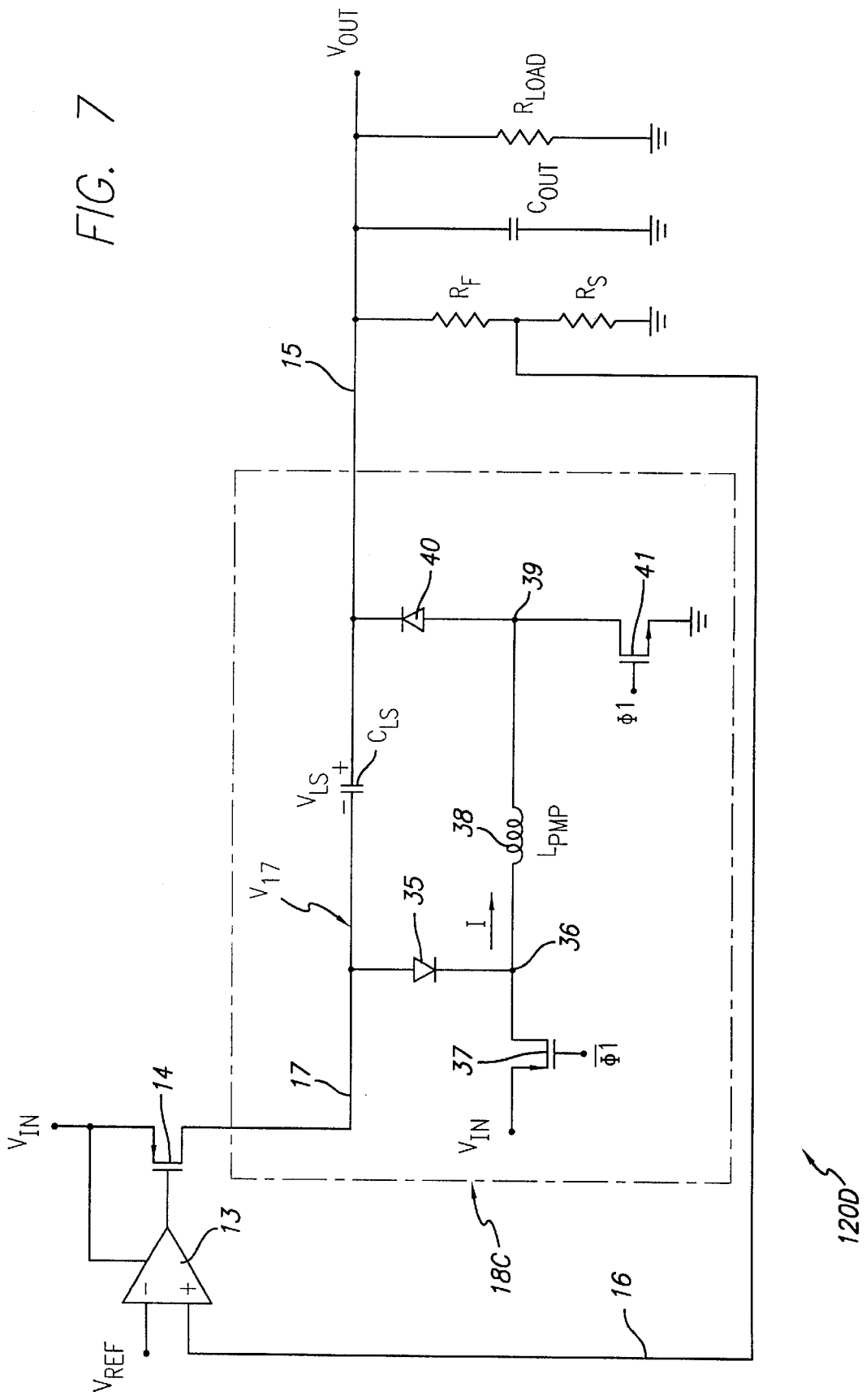
FIG. 7 is a schematic diagram of a low ripple DC-to-DC converter of the present invention which uses an inductor and capacitor in a charge pump to create the level shift voltage required to increase the output voltage beyond the input voltage.

FIG. 7 shows another DC-to-DC converter 120D which is the same as the one shown in FIG. 4A except that the charge pump circuitry 18A in FIG. 4A is replaced by the charge pump circuitry 18C shown in FIG. 7. In charge pump circuitry 18C, the (−) terminal of level shift capacitor $C_{LS}$ is connected to node 17 and the (+) terminal of level shift capacitor $C_{LS}$ is connected to output conductor 15, as in FIG. 4A. A steering diode 35 has its anode connected to node 17 and its cathode connected by conductor 36 to the drain of a P-channel transistor 37 and to one terminal of a "pump inductor" $L_{PMP}$. The source of transistor 37 is connected to $V_{IN}$, and its gate is connected to Φ1, which is the complement of Φ1. The other terminal of pump inductor $L_{PMP}$ is connected by conductor 39 to the drain of an N-channel transistor 41 and to the anode of a steering diode 40. The cathode of steering to 40 is connected to output conductor 15. The source of transistor 41 is connected to ground, and its gate is connected to Φ1. In operation, during Φ1 transistors 37 and 41 are both on and steering diodes 35 and 40 are off, and the current flowing from $V_{IN}$ through transistor 37, pump inductor $L_{PMP}$, and transistor 41 to ground is charged up to a value I. When transistors 37 and 41 are turned off, the current I then flows through pass transistor 14 and steering diodes 35 and 40. The voltage across pump inductor $L_{PMP}$ then causes the voltage $V_{LS}$ across level shift capacitor $C_{LS}$ to be charged toward the voltage across pump inductor $L_{PMP}$ minus the forward voltage drops across steering diodes 35 and 40. As this process is repeated, $V_{OUT}$ gradually reaches a low-ripple steady state value determined by $V_{REF}$ and the values of the feedback circuit resistors $R_F$ and $R_S$. Ordinarily, pump inductor $L_{PMP}$ and capacitors $C_{LS}$ and $C_{OUT}$ would be external components.

Figure 8:
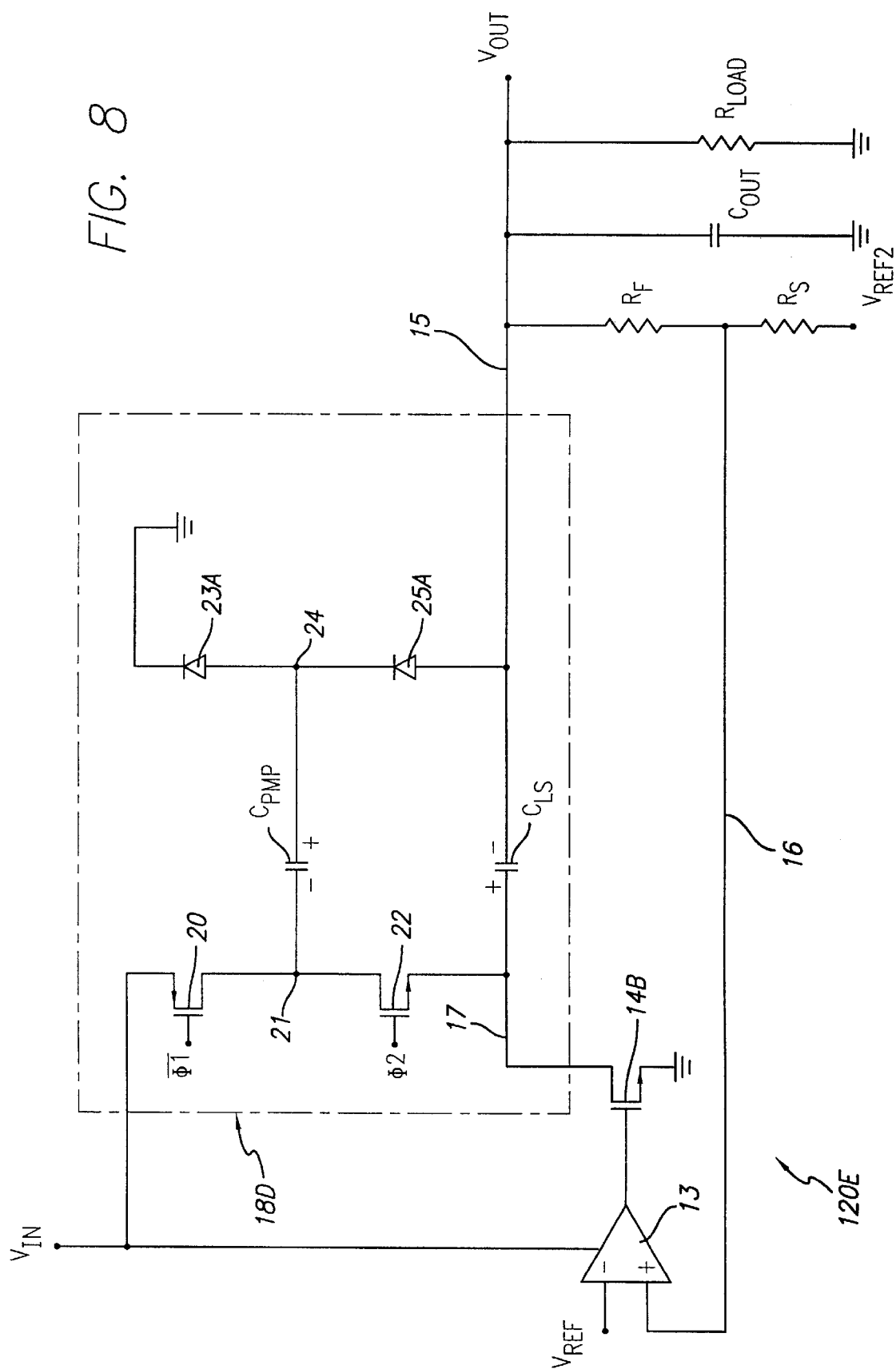
FIG. 8 is a schematic diagram of a low ripple DC-to-DC converter of the present invention which generates a negative output voltage from a positive input voltage.

FIG. 8 shows another DC-to-DC converter 120E that provides a negative value of $V_{OUT}$ from a positive value of $V_{IN}$. The connections and operation of DC-to-DC converter 120E are similar to the connections and operation of the circuit shown in FIG. 4A. However, in FIG. 8, the output of amplifier 13 is connected to the gate of an N-channel pass transistor 14B having its source connected to ground rather than $V_{IN}$. The (+) terminal of level shifting capacitor $C_{LS}$ is connected by conductor 17 to the drain of pass transistor 14B, and the (−) of level shifting capacitor $C_{LS}$ is connected to $V_{OUT}$. Charge pump circuit 18D includes P-channel transistor 20 having its source connected by conductor 21 to $V_{IN}$ and its drain connected to both the (+) terminal of pump capacitor $C_{PMP}$ and drain of N-channel transistor 22 period transistor 22 has its source connected to conductor 17 and its gate connected to Φ2. The gate of transistor 20 is connected to Φ1. The (−) terminal of $C_{PMP}$ is connected by conductor 24 to the anode of diode 23A and the cathode of diode 25A. The cathode of diode 23Ace connected to ground, and the anode of diode 25A is connected by conductor 15 to $V_{OUT}$. Resistor $R_S$ is referenced to $V_{REF2}$ rather than to $V_{REF}$.

When transistor 20 is on and transistor 22 is off, $C_{PMP}$ is charged to $V_{IN}$ volts minus the forward voltage drop of diode 23A. When transistor 22 is on and transistor 20 is off, the charge on $C_{PMP}$ is redistributed with the charge on capacitor $C_{LS}$, which causes $V_{OUT}$ to be of negative polarity, with amplitude determined by the values of $R_F$, $R_S$, $V_{REF}$ and $V_{REF2}$.

By way of definition, the term "charge pump" as used herein is intended to include both capacitive charge pumps, for example as shown in FIGS. 4A and 5 and inductive charge pumps, for example as shown in FIG. 7.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

For example, additional pump capacitors and associated charging/discharging switches could be coupled between the right terminal of the second pump capacitor $C_{PMP2}$ shown in FIG. 5 and $V_{OUT}$ to produce the level shift voltage as a higher integral multiple of $V_{IN}$ to maintain a higher average voltage across level shift capacitor $C_{LS}$. Other types of transistors than the disclosed MOSFETs could be utilized for the pass transistor and/or the switches in the charge pump circuitry. Also, the circuits disclosed could be easily modified to boost a negative polarity input voltage to a larger magnitude negative polarity output voltage. The pump capacitor could be replaced with an inductor or transformer or other device to transfer charge to the level shift capacitor. The level shift capacitor could be replaced with a photovoltaic diode or other device to create the level shift voltage.

What is claimed is:

1. A DC-to-DC conversion circuit having an input conductor for receiving an input voltage and an output conductor for conducting an output voltage, the DC-to-DC conversion circuit comprising:

(a) a pass transistor having a first electrode coupled to receive the input voltage and a second electrode coupled to a first conductor;

(b) amplifier circuitry having a first input coupled to receive a first reference voltage and an output coupled to a control electrode of the pass transistor;

(c) level shifting circuitry coupled to the first conductor, the output conductor, the input conductor, and a conductor conducting a second reference voltage, the level shifting circuitry being capable of providing energy needed to boost the output voltage to a required level; and (d) a feedback circuit coupled between the output conductor and a second input of the amplifying circuit.

2. A DC-to-DC conversion circuit having an input conductor for receiving an input voltage and an output conductor for conducting an output voltage, the DC-to-DC conversion circuit comprising:

(a) a pass transistor having a first electrode coupled to receive the input voltage and a second electrode coupled to a first conductor;

(b) amplifier circuitry having a first input coupled to receive a first reference voltage and an output coupled to a control electrode of the pass transistor;

(c) charge pump circuitry coupled to the first conductor, the output conductor, the input conductor, and a conductor conducting a second reference voltage;

(d) a level-shifting capacitor coupled between the first conductor and the output conductor; and (e) a feedback circuit coupled between the output conductor and a second input of the amplifying circuit.

3. A DC-to-DC conversion circuit having an input conductor receiving a input voltage and an output conductor for conducting an output voltage, the DC-to-DC conversion circuit comprising:

(a) a pass transistor having a first electrode coupled to receive the input voltage and a second electrode coupled to a first conductor;

(b) amplifier circuitry having a first input coupled to receive a first reference voltage and an output coupled to a control electrode of the pass transistor;

(c) a level-shifting capacitor coupled between the first conductor and the output conductor;

(d) charge pump circuitry having a first input terminal coupled to receive a second reference voltage, a second input terminal coupled to receive the input voltage, a first output terminal coupled to the first conductor, and a second output terminal coupled to the output conductor; and (e) feedback circuitry coupled between the output conductor and a second input of the amplifying circuit.

4. The DC-to-DC conversion circuit of claim 3 wherein the input voltage is an unregulated input voltage and the output voltage is a regulated output voltage.

5. The DC-to-DC conversion circuit of claim 3 wherein the second electrode of the pass transistor is a drain electrode.

6. The DC-to-DC conversion circuit of claim 3 wherein the pass transistor is a field effect transistor.

7. The DC-to-DC conversion circuit of claim 3 wherein the pass transistor is a P-channel field effect transistor and the second electrode is a drain electrode.

8. The DC-to-DC conversion circuit of claim 3 wherein the pass transistor is in N-channel field effect transistor and the second electrode is a source electrode.

9. The DC-to-DC conversion circuit of claim 8 including a charge pump circuit coupled between a drain of the N-channel field effect transistor and a voltage supply terminal of the amplifier circuitry.

10. The DC-to-DC conversion circuit of claim 3 wherein the charge pump circuitry includes a pump capacitor, a first switch coupled between the first conductor and a first terminal of the pump capacitor, a second switch coupled between the first terminal of the pump capacitor and the conductor conducting the second reference voltage, a third switch coupled between the output conductor and a second terminal of the pump capacitor, and a fourth switch coupled between the second terminal of the pump capacitor and the input voltage.

11. The DC-to-DC conversion circuit of claim 10 wherein the feedback circuitry includes a first resistor coupled between the output conductor and the second input of the amplifier circuitry and a second resistor coupled between the second input of the amplifier circuitry and the conductor conducting the second reference voltage.

12. The DC-to-DC conversion circuit of claim 10 wherein the first switch is a P-channel transistor having a source coupled to the first conductor and a drain coupled to the first terminal of the pump capacitor, the second switch is an N-channel transistor having a source coupled to the second reference voltage and a drain coupled to the first terminal of the pump capacitor, the third switch is a P-channel transistor having a source coupled to the output conductor and a drain coupled to the second terminal of the pump capacitor, and the fourth switch is a P-channel transistor having a source coupled to the input voltage and a drain coupled to the second terminal of the pump capacitor.

13. The DC-to-DC conversion circuit of claim 10 wherein the capacitance of the level-shifting capacitor is substantially greater than the capacitance of the pump capacitor, and wherein an output capacitance is substantially greater than the capacitance of the level-shifting capacitor.

14. The DC-to-DC conversion circuit of claim 3 wherein the charge pump circuitry includes a first pump capacitor, a first switch coupled between the first conductor and a first terminal of the first pump capacitor, a second switch coupled between the first terminal of the first pump capacitor and the second reference voltage, a third switch coupled between a second terminal of the first pump capacitor and a first terminal of a second pump capacitor, a fourth switch coupled between the second terminal of the first pump capacitor and the input voltage, a fifth switch coupled between the first terminal of the second pump capacitor and the second reference voltage, between the output conductor and a second terminal of the pump capacitor, a sixth switch coupled between a second terminal of the second pump capacitor and the input voltage, and coupling circuitry coupled between the output conductor and the-second terminal of the second pump capacitor.

15. The DC-to-DC conversion circuit of claim 14 wherein the coupling circuitry includes a seventh switch coupled between the output conductor and the second terminal of the second pump capacitor.

16. A method of boosting an input voltage to provide a low ripple output voltage, comprising:

(a) regulating flow of current between a source of the input voltage and a circuit node in response to a feedback signal representative of the output voltage; and (b) operating charge pump circuitry to repetitively charge a pump capacitor to a voltage equal to the input voltage and redistribute charge between the pump capacitor and a level-shifting capacitor coupled between the circuit node and an output conductor conducting the output voltage so as to maintain the output voltage at a regulated level of substantially greater magnitude than the input voltage.

17. A method of boosting an input voltage to provide a low ripple output voltage, comprising:

(a) regulating flow of current between a source of the input voltage and a circuit node in response to a feedback signal representative of the output voltage; and (c) operating DC-to-DC converter circuitry to repetitively charge a pump inductor to a current supplied by a source of the input voltage and redistribute energy stored in the pump inductor between the pump inductor and a level-shifting capacitor coupled between the circuit node and an output conductor conducting the output voltage so as to maintain the output voltage at a regulated level of substantially greater magnitude than the input voltage.

18. A DC-to-DC conversion circuit having an input conductor receiving a input voltage and an output conductor for conducting an output voltage, the DC-to-DC conversion circuit comprising:

(a) a pass transistor having a first electrode coupled to receive the input voltage and a second electrode coupled to a first conductor;

(b) amplifier circuitry having a first input coupled to receive a first reference voltage and an output coupled to a control electrode of the pass transistor;

(c) a level-shifting capacitor coupled between the first conductor and the output conductor;

(d) charge pump circuitry having a first input terminal coupled to receive a second reference voltage, a second input terminal coupled to receive the input voltage, a first output terminal coupled to the first conductor, and a second output terminal coupled to the output conductor; and (e) feedback circuitry coupled between the output conductor and a second input of the amplifying circuit, wherein the charge pump circuitry includes a pump inductor, a first steering diode having an anode coupled to the first conductor and a first terminal of the pump inductor, a second steering diode having an anode coupled to a second terminal of the pump inductor and a cathode coupled to the output conductor, a first switch coupled between the input conductor and the first terminal of the pump inductor, and a second switch coupled between the second terminal of the pump inductor and the conductor conducting the second reference voltage.

19. The DC-to-DC conversion circuit of claim 18 wherein the first switch is a P-channel transistor having a source coupled to the input conductor and a drain coupled to the second terminal of pump inductor and the second switch is an N-channel transistor having a source coupled to the second reference voltage and a drain coupled to the first terminal of the pump inductor.

20. A circuit for boosting an input voltage to provide a low ripple output voltage, comprising:

(a) means for regulating flow of current between a source of the input voltage and a circuit node in response to a feedback signal representative of the output voltage; and (b) charge pump means for repetitively charging a pump capacitor to a voltage equal to the input voltage and redistributing charge between the pump capacitor and a level-shifting capacitor coupled between the circuit node and an output conductor conducting the output voltage so as to maintain the output voltage at a regulated level of substantially greater magnitude than the input voltage.

21. A circuit for boosting an input voltage to provide a low ripple output voltage, comprising:

(a) means for regulating flow of current between a source of the input voltage and a circuit node in response to a feedback signal representative of the output voltage; and (b) charge pump means for repetitively charging a pump inductor to a voltage determined by the input voltage and redistributing charge between the pump inductor and a level-shifting capacitor coupled between the circuit node and an output conductor conducting the output voltage so as to maintain the output voltage at a regulated level of substantially greater magnitude than the input voltage.

22. A DC-to-DC conversion circuit having an input conductor for receiving an input voltage and an output conductor for conducting an output voltage, the DC-to-DC conversion circuit comprising:

(a) a pass transistor having a first electrode coupled to receive a first reference voltage and a second electrode coupled to a first conductor;

(b) amplifier circuitry having a first input coupled to receive a second reference voltage and an output coupled to a control electrode of the pass transistor;

(c) charge pump circuitry coupled to the first conductor, the output conductor, the input conductor, and a conductor conducting the first reference voltage;

(d) a level-shifting capacitor coupled between the first conductor and the output conductor; and (e) a feedback circuit coupled between the output conductor and a second input of the amplifying circuit.

23. A DC-to-DC conversion circuit having an input conductor for receiving an input voltage and an output conductor for conducting an output voltage, the DC-to-DC conversion circuit comprising:

(a) a pass transistor having a first electrode coupled to receive a first reference voltage and a second electrode coupled to a first conductor;

(b) amplifier circuitry having a first input coupled to receive a first reference voltage and an output coupled to a control electrode of the pass transistor;

(c) level shifting circuitry coupled to the first conductor, the output conductor, the input conductor, and a conductor conducting the second reference voltage, the level shifting circuitry being capable of providing energy needed to boost the output voltage to a required level; and (d) a feedback circuit coupled between the output conductor and a second input of the amplifying circuit.

* * * * *